Figure 1:
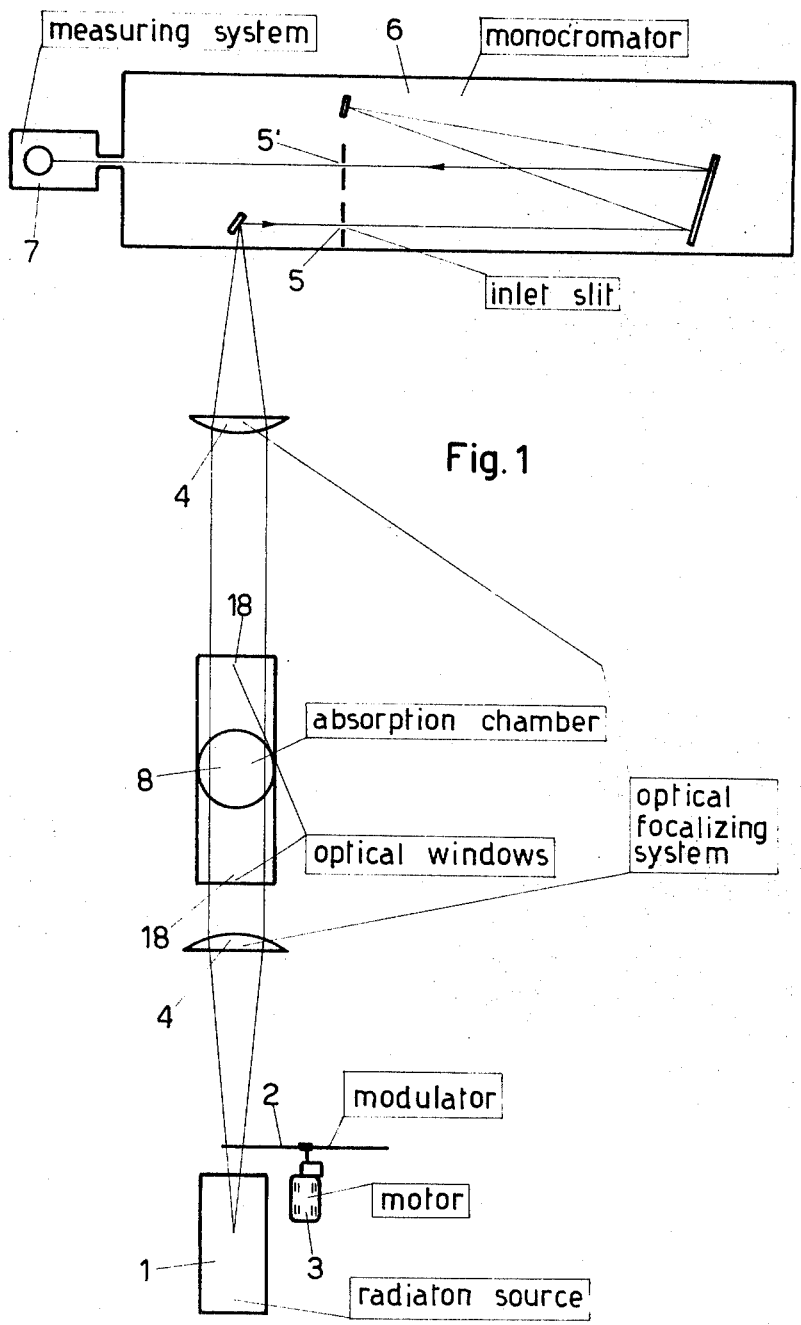

United States Patent

Bordonali et al.

[15] 3,684,884
[45] Aug. 15, 1972

[54] APPARATUS TO BE USED FOR THE ANALYSIS OF TRACES OF CHEMICAL ELEMENTS THROUGH ATOMIC ABSORPTION

[72] Inventors: Corrado Bordonali; Marie Antonietta Biancifiori, both of Via Colleferro 4, Rome, Italy

[22] Filed: Jan. 15, 1970

[21] Appl. No.: 3,170

Related U.S. Application Data

[63] Continuation-in-part of Ser. No. 659,949, Aug. 11, 1967, abandoned.

[52] U.S. Cl. .................................................. 250/43.5 R
[51] Int. Cl. ..................................................... G01n 21/34
[58] Field of Search ...23/230 R, 230 PC; 250/435 R; 356/93, 95, 96, 97

[56] References Cited

UNITED STATES PATENTS

| 2,932,558 | 4/1960 | Bennet | 23/230 |
| 3,296,435 | 1/1967 | Teal et al. | 250/43.5 |

*Primary Examiner*—William F. Lindquis
*Attorney*—Richards & Geier

[57] ABSTRACT

For the purpose of spectrophotometric analysis through atomic absorption technique, an absorption chamber containing an amount of the sample to be analyzed mixed with a plasmogen gas is inserted into the path of a radiation beam having the same frequency as the characteristic frequency of the element to be measured.

A plasma of a suitable gas, obtained by electromagnetic induction, is used to bring the atoms of the sample to a form capable of producing absorption. A reducing reagent is also added, in a mixing chamber, to the plasmogen gas containing the sample to be analyzed to enhance the absorption capability of the sample. Solid, liquid, gas samples can be analyzed. The radiation intensity, attenuated along its path through an absorption chamber, is measured and, by comparison with the radiation intensity previously measured when no absorption occurred, the concentration is determined.

2 Claims, 3 Drawing Figures

APPARATUS TO BE USED FOR THE ANALYSIS OF TRACES OF CHEMICAL ELEMENTS THROUGH ATOMIC ABSORPTION

This application is a continuation-in-part of a copending application Ser. No. 659,949, filed Aug. 11, 1967, now abandoned.

The present invention relates to a method and apparatus to be used in the technique of the chemical analysis of many chemical elements through atomic absorption wherein a plasma is used as heat source. This technique, as known, is based upon the measurement of the attenuation of the intensity, occurring at a certain wave length, of the radiation emitted by a source, which attenuation is due to the fact that said radiation is passed through an ambient containing a chemical element, which will be referred to as the absorbing element and which is brought to the temperature and pressure conditions at which the radiation is liable to be absorbed. The equipment commonly used for said technique comprises the following basic components:

a radiation source;
a focalizing optical system;
an apparatus for releasing the absorbing element from the sample;
an absorption cell;
a monochromator;
a system for measuring the intensity of the radiation under examination.

The invention which is the subject of this application is particularly concerned with the method and the means to be used for producing the absorbing elements and with the absorption cell.

The usual means for producing the absorbing elements comprises flames which are generally obtained through a reaction of a combustible and a combustion supporter; these means however suffer from the following limitations:

1. Temperatures above 4,000° K cannot be attained;
2. If one of the flame producing reagents is fed in an amount greater than the stoichiometric proportion this has a negative influence on the useful temperature;
3. Whenever such elements are to be analyzed which in the usual flames are liable to produce refractory compounds, reducing flames must be used, that is such flames which require a ratio of combustible-to-combustion supporter greater than the stroichiometric proportion.

Due to the above mentioned reasons, the measuring of chemical elements produced by means of flames is hardly sensitive and in the case of particular elements is not feasible.

The method of this invention avoids such limitations inasmuch as:

1. Very high temperatures are used which are obtained not through combustion, for example by induction heating of the sample, but by means of a plasma (obtained by means of an electromagnetic field which provides heating of a gas capable of being excited and ionized by electromagnetic induction) which plasma is mixed to the sample to be analyzed.
2. The temperature is not appreciably altered by the introduction of the reagents.
3. Also those chemical elements can be analyzed which usually produce refractory compounds in a flame;

consequently the measuring sensitivity is remarkably increased also for those elements of which the analysis can be effected with the usual method of the flame.

Another object of the present invention is to produce atomic thermal dissociation of the sample so that it is in atomic form when subjected to the analyzer beam, different from other methods of analysis which extract molecular forms from the samples and perform analytical measures (by weighing, by spectrophotometry or by other means) directly on the molecular form.

Still another object of this invention is to provide an apparatus whereby a number of elements can be singly analyzed differently from other apparatuses of the present art which are adapted for analyzing a given element only.

This is achieved in this invention, first of all by introducing such reagents capable of releasing the elements to be analyzed from the refractory compounds; the action of the reagents concur with the high temperature proper of the plasma in enhancing the absorption capability of the sample.

As non limitative examples, solid reagents such as carbon and liquid reagents such as alcohols such as isopropyl alcohol and gaseous reagents such as acetylene, methane and hydrogen have been advantageously used. However, other kinds of reagents may be usefully used; particularly, in the case of substances containing carbon and/or hydrogen, all those substances may be used which have a ratio C to O greater than 1 or a ratio H to O greater than 2.

As it appears from the above, the reagents recited as examples all act by reduction. The amount of reagent introduced will be slightly in excess of the stoichiometric amount required for producing the release of the absorbing chemical elements.

Figure 2:
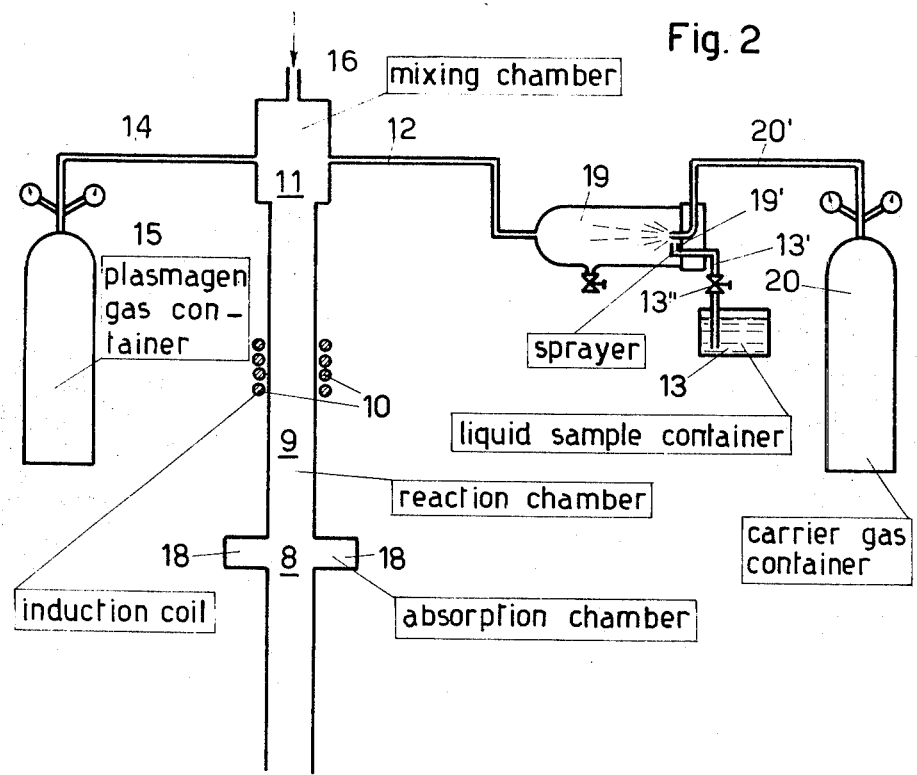
Figure 3:
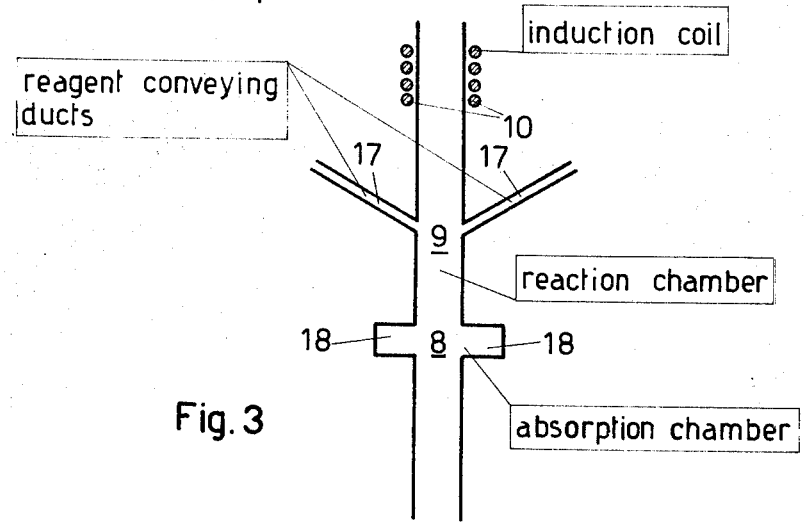

An apparatus for applying the method of this invention is illustrated diagrammatically in the attached drawings wherein:

FIG. 1 shows a general outline of the apparatus of the invention in plan view;
FIG. 2 is a partial front view of the same apparatur;
FIG. 3 is a variant of the apparatus of FIG. 2.

With reference to FIG. 1, the apparatus of the present invention comprises:

A radiation source 1 which may be a hollow cathode lamp, a discharge lamp, an arc, etc. The source is chosen so that some of the characteristic frequencies of the element to be examined are produced. Furthermore the spectra emitted from these lamps should be of any known fine line type;

A modulator 2 of the radiation beam, which modulator comprises a disk provided with sectors alternately transparent and opaque to said radiation;

A motor 3 for driving said disk, the latter being so positioned with respect to the radiation beam that this beam is periodically interrupted by it with a frequency depending upon the number of the disk sectors and on the motor revolutions. It is to be understood that such modulator is cited as an example only, and other modulating devices acting either on the radiation beam or on the source may be substituted for it;

A monochromator 6 provided with an inlet slit 5 and an outlet slit 5' which monochromator is adapted to detect and amplify the alternating signal produced by modulator 2;

An optical system 4 for focalizing source 1 on inlet slit 5 of monochromator 6;

A measuring system 7 associated with monochromator 6;

An absorption chamber 8 inserted in the path of the radiation beam;

A reaction chamber 9 (see FIG. 2) directly communicating with absorption chamber 8;

A coil 10 (FIG. 2) located outside of the reaction chamber 9 and surrounding it; which coil is fed with high frequency current by an oscillator not shown. The number and arrangement of the coil turns as shown in FIG. 2 are not binding; they are given as an example only; in any case they are to be chosen so as to obtain the maximum power exchange between the oscillator and the plasma;

A mixing chamber 11 which communicates with said reaction chamber 9;

A bottle 15 adapted to contain a gas capable of being excited and transformed into a plasma by electromagnetic induction, which gas will be called plasmagen gas;

A line 14 connecting said container 15 to said mixing chamber 11;

A container 13 adapted to contain the sample to be analyzed when this is a liquid;

A vessel 19, within which a spraying means 19' is provided comprising a nozzle for supplying a liquid and a nozzle for supplying a gas;

A line 13' connecting container 13 to spraying means 19' in vessel 19, a valve 13" being provided along said line 13';

A bottle 20 adapted to contain a carrier gas;

A line 20' connecting bottle 20 to spraying means 19' in vessel 19;

A line connecting vessel 19 to mixing chamber 11;

A duct 16 connected to mixing chamber 11.

The above described apparatus may be used in different ways which differ from one another mainly in the manner in which the sample, the plasmagen gas and the reagent are fed to the apparatus.

When the sample is a gas it is preferably charged in bottle 20 and fed to mixing chamber 11 through line 12. In this case valve 13" is closed. When the sample is a liquid it is charged into container 13. From the latter it is conveyed through line 13' and valve 13" to the liquid supplying nozzle of sprayer 19' in vessel 19 and eventually is fed to mixing chamber 11 through line 12. When the sample is solid it is fed to the mixing chamber through duct 16 in a pulverulent form. The plasmagen gas may be charged in bottle 15 or in bottle 20. In the latter case in addition to performing its function as a plasmagen gas, it performs also the function of carrier gas that is the function of spraying the liquid sample in vessel 19 and of carrying the sprayed liquid from container 13 into mixing chamber 11 and into reaction chamber 9 and of carrying the pulverulent or gaseous sample from chamber 11 into chamber 9 after being mixed therewith in chamber 11.

The reagents when in a solid, liquid or gaseous form may be introduced through duct 16 that is through the same duct used for inletting a pulverulent or gaseous sample into chamber 11. However, when the reagents are liquid or gaseous, the reagents may be previously mixed or evaporated into the plasmagen gas or in the carrier gas and stored in bottle 15 or in bottle 20. In this case they are admitted to mixing chamber 11 through line 14 or through line 12 respectively.

The above arrangement of the parts which lead into the mixing chamber 11 is given, in any case, as a non-limitative example. Particular care has been used to obtaining a perfect mixing of the adjoining chemical elements by disposing the inlets of the various substances in a way to create a rotary component of the flow inside chamber 11.

According to a variant of the above arrangement, a plurality of ducts 17 are provided which communicate with reaction chamber 9.

The purpose of ducts 17 is for admitting into the apparatus the reagents which consequently, according to this variant, are not admitted through lines 12, 14 or through duct 16.

The absorption chamber 8 is provided with apertures coaxial with the optical axis of the system which apertures may be closed, for particular applications, by means of optical windows 18. Chambers 8, 9 and 11 are rigidly connected to each other. The walls of chambers 8 and 11 may be made of any suitable material which may be an electricity conductor but which must be compatible with the intended use of the apparatus. Since the walls of chamber 9 are surrounded by induction coil 10, they should be made of a dielectric material in order that the electro-magnetic field inside the chamber be not influenced by it.

In a preferred embodiment of the present invention given by way of non-limitative example, the walls of chamber 8, 9 and 11 are made of quartz, the diameter of said chambers being a few centimeters while the heating power is in the order of few kilowatts.

The purpose of coil 10, as already mentioned, is for generating an electromagnetic high frequency field whereby the plasmagen gas is excited and ionized and brought to the plasma state at high temperature. The inventors have found that the addition of the reagents either upstream of reaction chamber 9 or into the same enhances the absorption capability of the sample. This is probably due to the fact that further amounts of the elements to be analyzed are released from the refractory compounds containing them by the action of the reagents.

The operation of the above described apparatus is as follows with reference particularly to FIG. 2:

After lighting up lamp 1 of the element to be sought in the sample (a hollow cathode lamp, a discharge lamp etc.), the beam of the emitted radiation is collimated on the inlet slit 5 of monochromator 6. By means of the latter a particular wave length is selected of the spectrum of the element under examination and the intensity of the radiation is measured. The modulator 2 is started. At this point coil 10 is energized; the plasma is generated and the sample of material containing the element which is the object of the analysis is fed into the mixing chamber 11, either in a pulverulent state or as a solution along the previously selected reagent. The radiation intensity is then measured and, by comparison with the radiation intensity previously measured when no absorption occurred, the concentration is determined.

As far as the variant of FIG. 3 is concerned, the operation sequence will be the same as above described except that the reducing substances are introduced through lines 17 downstream of the heating coil 10.

The above described method and apparatus have been employed in a number of experiments of which the following is a non-limitative example, concerning the determination of ytterbium (Yb) traces in an aqueous solution of aluminum nitrate.

EXAMPLE

The sample comprising an aluminum nitrate solution with a concentration 0.1 molar of aluminum with traces of ytterbium was analyzed for determining the ytterbium content. For this purpose a few cubic centimeters of said solution are charged into container 13, while argon is charged in bottle 15 as plasmagen gas and argon is again charged in bottle 20 as carrier gas.

The apparatus is then started as follows:

Hollow cathode lamp 1 of which the cathode consists of ytterbium is energized at a current of about 10 mA;

the image of said cathode is focalized on inlet slit 5 of monochromator 6 which in this case is adjusted to a width of about 100 microns while outlet slit 5' is adjusted at a width of about 20 microns;

measuring system 7 is then energized at a voltage of about 800 volt;

monochromator 6 is then adjusted at a wave length of 3,998 A which is the characteristic wavelength of ytterbium. The output signal voltage from measuring system 7 at this known wavelength, in the absence of the sample in absorption chamber 8, is about 10 mV;

a flow of argon from bottle 15 and a flow of argon from bottle 20 are admitted into mixing chamber 11, while valve 13'' is kept momentarily closed;

coil 10 is then energized and the plasma is started with the usual technique of the graphite rod and the power of coil 10 is adjusted at about 5 KW;

by opening valve 13'' the sample solution is fed from container 13 to sprayer 19' and together with the carrier gas to mixing chamber 11 and eventually to reaction chamber 9 and to absorption chamber 8;

hydrogen is then fed as a reducing agent through duct 16 in an amount equal to 1 percent by volume of argon. At this point an attenuation is noticed of the output signal from measuring system 7. The signal voltage is in fact 9.5 mV.

From this reading and the previous reading of 10 mV the attenuation factor is calculated by the following formula $$D = \log(10)/(9.5) = 0.025$$

The ytterbium content in the sample is then determined by interpolating this value of the attenuation factor in a calibration graph (which is a straight line) having the attenuation factor and the concentration as coordinates, which graph has been prepared in advance with samples of known concentration. In the present example the attenuation factor 0.025 corresponds to a ytterbium concentration of about 10 ppm.

What we claim is:

1. An apparatus for the analysis of chemical elements contained in a gaseous, liquid or solid sample through atomic absorption which apparatus comprises an absorption chamber (8), means directing into said chamber an ultraviolet radiation beam having the same frequency as the characteristic absorption frequency of the element to be analyzed, a reaction chamber (9) communicating with said absorption chamber, a mixing chamber (11) communicating with said reaction chamber, an electromagnetic induction coil (10) for high frequency current enclosing said reaction chamber, a first container (15) adapted to contain a fluid capable of being excited by electromagnetic induction and transformed into a plasma thereby which causes thermal atomic dissociation, a first line (14) connecting said first container with said mixing chamber, a second container (13) adapted to contain the sample to be analyzed when said sample is a liquid, a vessel (19) within which is provided a spraying means, a second line (13') connecting said second container to said spraying means in said vessel, a third container (20) adapted to contain a carrier gas, a third line (20') connecting said third container to said spraying means in said vessel, a fourth line connecting said vessel to said mixing chamber; an inlet means (16) adapted to supply said mixing chamber with the sample to be analyzed when said sample is a solid in pulverulent form, which apparatus comprises also a means, on the side of said absorption chamber opposite said directing means, for measuring the attenuation of said radiation beam by passage through said absorption chamber.

2. An apparatus for the analysis of chemical elements contained in a gaseous, liquid or solid sample through atomic absorption which apparatus comprises an absorption chamber (8); means directing into said chamber an ultra-violet radiation beam having the same frequency as the characteristic absorption frequency of the element to be analyzed; a reaction chamber (9) communicating with said absorption chamber; a mixing chamber (11) communicating with said reaction chamber; an electromagnetic induction coil (10) for high frequency current enclosing said reaction chamber; a first container (15) adapted to contain a fluid capable of being excited by electromagnetic induction and transformed into a plasma thereby which causes thermal atomic dissociation of said sample; a first line (14) connecting said first container with said mixing chamber; a second container (13) adapted to contain the sample to be analyzed when said sample is a liquid; a vessel (19) within which a spraying means is provided; a second line (13') connecting said second container to said spraying means in said vessel; a third container (20) adapted to contain a carrier gas; a third line (20') connecting said third container to said spraying means in said vessel; a fourth line (12) connecting said vessel to said mixing chamber; an inlet means (16) adapted to supply said mixing chamber with the sample to be analyzed when said sample is a solid in pulverulent form; which apparatus is further provided with another inlet means (17) adapted to admit at least one reagent in said reaction chamber; which apparatus comprises also means, on the side of said absorption chamber opposite said directing means, for measuring the attenuation of said radiation beam by passage through said absorption chamber.

* * * * *